United States Patent
Chawla et al.

(10) Patent No.: US 11,416,330 B2
(45) Date of Patent: Aug. 16, 2022

(54) LIFECYCLE OF HANDLING FAULTS IN NEXT GENERATION STORAGE SYSTEMS

(71) Applicant: EMC IP Holding Company LLC, Hopkinton, MA (US)

(72) Inventors: Rohit K. Chawla, Scotch Plains, NJ (US); Philippe Armangau, Acton, MA (US); Dixitkumar Patel, Monroe, NJ (US); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 17/083,584

(22) Filed: Oct. 29, 2020

(65) Prior Publication Data

US 2022/0138039 A1 May 5, 2022

(51) Int. Cl.
*G06F 11/00* (2006.01)
*G06F 11/07* (2006.01)
*G06F 16/2455* (2019.01)
*G06F 9/54* (2006.01)

(52) U.S. Cl.
CPC .......... *G06F 11/0793* (2013.01); *G06F 9/542* (2013.01); *G06F 11/0709* (2013.01); *G06F 11/0727* (2013.01); *G06F 16/24556* (2019.01)

(58) Field of Classification Search
CPC ............. G06F 11/0793; G06F 11/0709; G06F 11/0727; G06F 11/079; G06F 11/1402; G06F 11/1471; G06F 11/0706; G06F 11/0703
See application file for complete search history.

(56) References Cited

U.S. PATENT DOCUMENTS

| 7,343,529 | B1 * | 3/2008 | Klinkner | G06F 11/0748 714/57 |
|---|---|---|---|---|
| 9,461,890 | B1 | 10/2016 | Nair et al. | |
| 9,798,788 | B1 | 10/2017 | Reiner et al. | |
| 9,817,832 | B1 | 11/2017 | Protopopov et al. | |
| 10,037,251 | B1 | 7/2018 | Bono et al. | |
| 10,402,090 | B1 | 9/2019 | Tsaur et al. | |
| 2009/0164853 | A1 * | 6/2009 | Gokhale | G06F 11/0748 714/57 |
| 2015/0019909 | A1 * | 1/2015 | Griffith | G06F 11/1469 714/15 |
| 2018/0129573 | A1 * | 5/2018 | Iturbe | G06F 11/184 |

* cited by examiner

*Primary Examiner* — Katherine Lin
(74) *Attorney, Agent, or Firm* — BainwoodHuang

(57) ABSTRACT

Techniques for providing lifecycle handling of faults associated with a storage appliance. The techniques can include recording information or details of one or more detected faults associated with a storage appliance in a fault database, analyzing the recorded fault information/details by an analytic tool, and determining whether to perform immediate recovery or defer recovery of the detected fault(s) based at least on a recommendation of the analytic tool. In this way, taking the storage appliance offline upon occurrence of a single fault can, for the most part, be avoided. In addition, because the detection of faults is not performed within a fault domain for a filesystem handling files for a single or limited number of volume families, a deduplication domain for the files of the filesystem is not restricted to the single or limited number of volume families.

16 Claims, 4 Drawing Sheets

LIFECYCLE OF HANDLING FAULTS IN NEXT GENERATION STORAGE SYSTEMS

BACKGROUND

In a data storage system, a typical storage appliance has read-write input/output (IO) access to storage objects or resources such as filesystems, volumes (VOLs), virtual volumes (VVOLs), logical units (LUs), and so on. The storage appliance is configured to receive storage IO requests from one or more client computers over a network. In response to the storage IO requests, the storage appliance performs storage IO operations (e.g., read-write IO operations) to read/write blocks, files, pages, segments, chunks, or any other suitable units of data storage to/from one or more of the storage objects or resources. From time to time, a fault may be detected at the storage appliance due to a media error, data inconsistency, or other cause. To avoid having to take the storage appliance offline upon detection of such a fault, a plurality of fault domains may be created for a plurality of filesystems, respectively, in which each fault domain is isolated from the other fault domains such that a fault detected in one fault domain has no impact on any of the other fault domains.

SUMMARY

Typical storage appliances have drawbacks, however, particularly with regard to the effect that multiple fault domains can have on certain functionality of the storage appliances such as data deduplication. For example, in a storage appliance that has multiple fault domains, each fault domain can be created for a filesystem that handles storage and retrieval of files for a single volume family, which can include a primary volume as well as snapshots and/or clones of the primary volume. However, creating a fault domain for a filesystem that handles files for a single volume family can restrict a deduplication domain for the files to the single volume family, preventing any increased data reduction that might be achieved if data deduplication were performed across more than one volume family. To avoid the drawbacks of storage appliances with multiple fault domains, a storage appliance can be configured to include a single fault domain for one or more filesystems that handle files for multiple volume families, allowing data deduplication to be performed across the respective volume families in the single fault domain. However, such a storage appliance configuration also has drawbacks because it can result in the storage appliance and/or filesystem(s) being taken offline upon detection of a single fault.

Improved techniques are disclosed herein for providing lifecycle handling of faults associated with a storage appliance. The disclosed techniques can provide lifecycle handling of recoverable (also referred to herein as "correctable") faults and non-recoverable (also referred to herein as "uncorrectable") faults associated with the storage appliance. In the disclosed techniques, upon detection of a fault associated with the storage appliance, information or details pertaining to the fault (also referred to herein as "fault data") can be recorded in a fault database. For example, such fault data can include a metadata type, volume identifier (ID), volume family ID, logical address range, physical address range, recovery action, and so on. Having recorded the fault data in the fault database, the storage appliance can send the fault data in a fault alert notification to a storage administrator computer. The fault data, as well as any other fault data pertaining to prior detected faults associated with the storage appliance, can be analyzed by a fault analytic tool at the storage administrator computer, as well as recorded and aggregated in a fault archive database for predictive fault analysis. A determination can then be made as to whether the storage appliance should be taken offline immediately based at least on a recommendation of the fault analytic tool. Further determinations can also be made as to whether the fault is a correctable fault, and, if determined to be correctable, whether recovery of the fault should be performed immediately or can be deferred to a later time based at least on the recommendation of the fault analytic tool.

By recording and aggregating, in a fault database, fault data pertaining to detected faults associated with a storage appliance, analyzing the aggregated fault data by a fault analytic tool, and determining whether to perform immediate recovery of one or more of the detected faults or defer fault recovery to a later time based at least on a recommendation of the fault analytic tool, taking the storage appliance offline upon detection of a single fault can, for the most part, be avoided. In addition, because the detection of faults is not performed within a fault domain for a filesystem handling files for a single or limited number of volume families, a deduplication domain for the files of the filesystem is not restricted to just the single or limited number of volume families.

In certain embodiments, a method of lifecycle handling of faults associated with a storage appliance includes recording and aggregating fault data pertaining to a plurality of detected faults associated with a storage appliance in a fault database, analyzing the aggregated fault data to generate a recommendation for recovery of a detected fault from among the plurality of detected faults, and performing immediate or deferred recovery of the detected fault based at least on the recommendation, thereby reducing occurrences of the storage appliance being taken offline upon detection of a single fault.

In certain arrangements, the method includes generating at least one fault alert notification containing the fault data.

In certain arrangements, the method includes sending, by a fault alert application programming interface (API), the at least one fault alert notification to a control path for transmission from the storage appliance to a storage administrator computer.

In certain arrangements, the method includes extracting at least some of the fault data from the at least one fault alert notification.

In certain arrangements, the method includes determining that the detected fault is correctable.

In certain arrangements, the method includes, having determined that the detected fault is correctable, determining whether the recovery of the detected fault is deferrable or undeferrable.

In certain arrangements, the method includes, having determined that the recovery of the detected fault is deferrable, scheduling the recovery of the detected fault to be performed at a later time.

In certain arrangements, the method includes, having determined that the recovery of the detected fault is undeferrable, scheduling the recovery of the detected fault to be performed immediately.

In certain arrangements, the method includes, upon completion of the recovery of the detected fault, clearing or resetting a record of the detected fault from the fault database.

In certain arrangements, the method includes, having determined that the recovery of the detected fault is deferrable, continuing to aggregate fault data and analyze the aggregated fault data for subsequent detected faults associated with the storage appliance.

In certain arrangements, the method includes determining whether or not the recovery of the detected fault is deferrable in view of the continued aggregation and analysis of the aggregated fault data for the subsequent detected faults associated with the storage appliance.

In certain arrangements, the method includes, having determined that the recovery of the detected fault is not deferrable in view of the continued aggregation and analysis of the aggregated fault data, changing a state of the recovery of the detected fault from deferrable to undeferrable, and scheduling the recovery of the detected fault to be performed immediately.

In certain embodiments, a system for lifecycle handling of faults associated with a storage appliance includes a memory and processing circuitry configured to execute program instructions out of the memory to record and aggregate fault data pertaining to a plurality of detected faults associated with a storage appliance in a fault database, to analyze the aggregated fault data to generate a recommendation for recovery of a detected fault from among the plurality of detected faults, and to perform immediate or deferred recovery of the detected fault based at least on the recommendation, thereby reducing occurrences of the storage appliance being taken offline upon detection of a single fault.

In certain arrangements, the processing circuitry is further configured to execute the program instructions out of the memory to determine that the detected fault is correctable, and, having determined that the detected fault is correctable, to determine whether the recovery of the detected fault is deferrable or undeferrable.

In certain arrangements, the processing circuitry is further configured to execute the program instructions out of the memory, having determined that the recovery of the detected fault is deferrable, to continue to aggregate fault data and analyze the aggregated fault data for subsequent detected faults associated with the storage appliance.

In certain arrangements, the processing circuitry is further configured to execute the program instructions out of the memory to determine whether or not the recovery of the detected fault is deferrable in view of the continued aggregation and analysis of the aggregated fault data for the subsequent detected faults associated with the storage appliance.

In certain arrangements, the processing circuitry is further configured to execute the program instructions out of the memory, having determined that the recovery of the detected fault is not deferrable in view of the continued aggregation and analysis of the aggregated fault data, to change a state of the recovery of the detected fault from deferrable to undeferrable, and to schedule the recovery of the detected fault to be performed immediately.

In certain embodiments, a computer program product includes a set of non-transitory, computer-readable media having instructions that, when executed by processing circuitry, cause the processing circuitry to perform a method of lifecycle handling of faults associated with a storage appliance. The method includes recording and aggregating fault data pertaining to a plurality of detected faults associated with a storage appliance in a fault database, analyzing the aggregated fault data to generate a recommendation for recovery of a detected fault from among the plurality of detected faults, and performing immediate or deferred recovery of the detected fault based at least on the recommendation, thereby reducing occurrences of the storage appliance being taken offline upon detection of a single fault.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an exemplary storage node that can be included in the storage appliance of FIG. 1a;

FIG. 1c is a block diagram of a storage administrator computer that can be employed in the storage system environment of FIG. 1a;

DETAILED DESCRIPTION

Techniques are disclosed herein for providing lifecycle handling of faults associated with a storage appliance. In the disclosed techniques, upon detection of a fault associated with the storage appliance, information or details pertaining to the fault (also referred to herein as "fault data") can be recorded in a fault database. Having recorded the fault data in the fault database, the storage appliance can send the fault data in a fault alert notification to a storage administrator computer. The fault data, as well as any other fault data pertaining to prior detected faults associated with the storage appliance, can be analyzed by a fault analytic tool at the storage administrator computer, as well as recorded and aggregated in a fault archive database. A determination can then be made as to whether the storage appliance should be taken offline immediately based at least on a recommendation of the fault analytic tool. Further determinations can also be made as to whether the fault is a correctable fault, and, if determined to be correctable, whether recovery of the fault should be performed immediately or can be deferred to a later time based at least on the recommendation of the fault analytic tool.

Figure 1A:
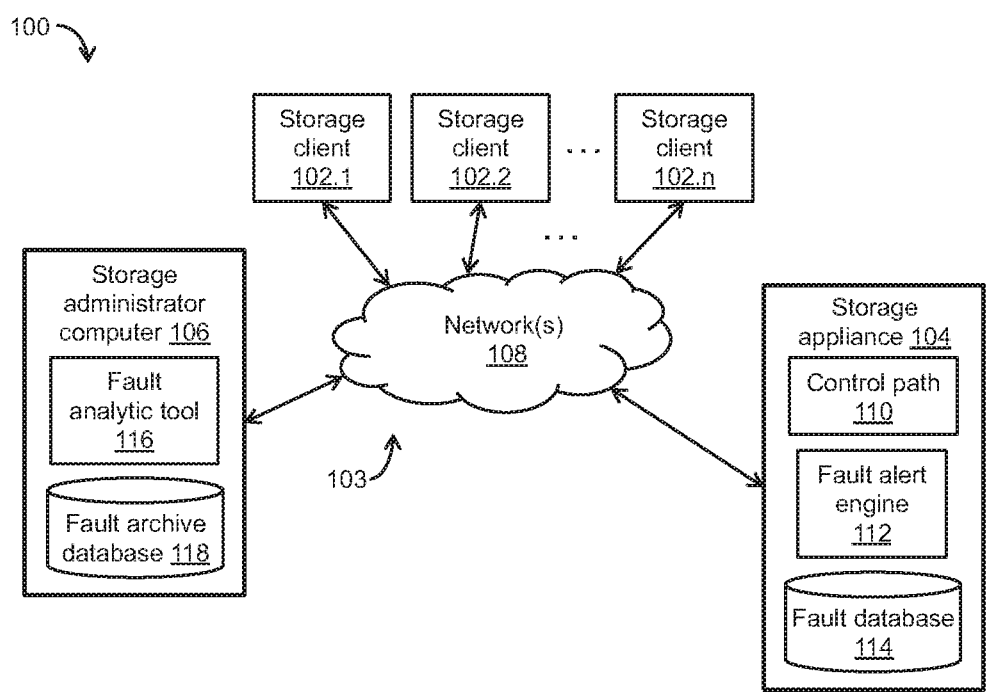
FIG. 1a is a block diagram of an exemplary storage system environment, in which techniques can be practiced for providing lifecycle handling of faults associated with a storage appliance.

FIG. 1a depicts an illustrative embodiment of an exemplary storage system environment 100, in which techniques can be practiced for providing lifecycle handling of faults associated with a storage appliance. As shown in FIG. 1a, the storage system environment 100 can include a plurality of storage client computers (also referred to herein as "storage client(s)") 102.1, 102.2, . . . , 102.n, a storage appliance 104, a storage administrator computer 106, and a communications medium 103 that includes at least one network 108. For example, each of the plurality of storage clients 102.1, . . . , 102.n can be configured as a web server computer, a file server computer, an email server computer, an enterprise server computer, and/or any other suitable client/server computer or computerized device. The plurality of storage clients 102.1, . . . , 102.n can provide, over the network(s) 108, storage input/output (IO) requests (e.g., small computer system interface (iSCSI) commands, network filesystem (NFS) commands) to the storage appliance 104. Such storage IO requests (e.g., write IO requests, read IO requests) can direct a storage processor or controller (also referred to herein as a "storage node") included in the storage appliance 104 to write or read blocks, files, pages, segments, chunks, and/or any other suitable units of data storage to/from filesystems, volumes (VOLs), virtual volumes (VVOLs), logical units (LUs), or any other suitable storage objects or resources maintained in association with the storage appliance 104. The storage administrator computer 106 can be configured as a desktop computer, a laptop computer, a tablet computer, a smartphone, and so on. The storage administrator computer 106 can provide an interface by which a storage administrator can interact with the storage appliance 104 over the network(s) 108.

As shown in FIG. 1a, the storage appliance 104 can include a control path 110, a fault alert engine 112, and a fault database 114; and, the storage administrator computer 106 can include a fault analytic tool 116 and a fault archive database 118. From time to time, a fault may be detected at the storage appliance 104 due to a media error, data inconsistency, or other cause. Such a fault can be a recoverable (or correctable) fault or a non-recoverable (or uncorrectable) fault. For example, a correctable fault may be detected in the storage appliance 104, requiring one or more data blocks or metadata of a filesystem to be rebuilt. Further, an uncorrectable fault may be detected in the storage appliance 104, resulting from data corruption in a storage resource or device upon which the filesystem was organized. In the disclosed techniques, upon detection of a fault associated with the storage appliance 104, information or details pertaining to the fault (i.e., fault data) can be generated and recorded in the fault database 114. For example, such fault data can include a metadata type, volume identifier (ID), volume family ID, logical address range, physical address range, recovery action, or any other suitable fault data. Once the fault data is recorded in the fault database 114, the fault alert engine 112 can generate a fault alert notification containing the fault data, and the fault alert notification can be issued over the control path 110 for transmission over the network(s) 108 to the storage administrator computer 106. At the storage administrator computer 106, the fault data can be extracted from the fault alert notification, analyzed by the fault analytic tool 116 to determine the impact of the fault, and stored as a record in the fault archive database 118 for predictive fault analysis.

Figures 1B, 1C:
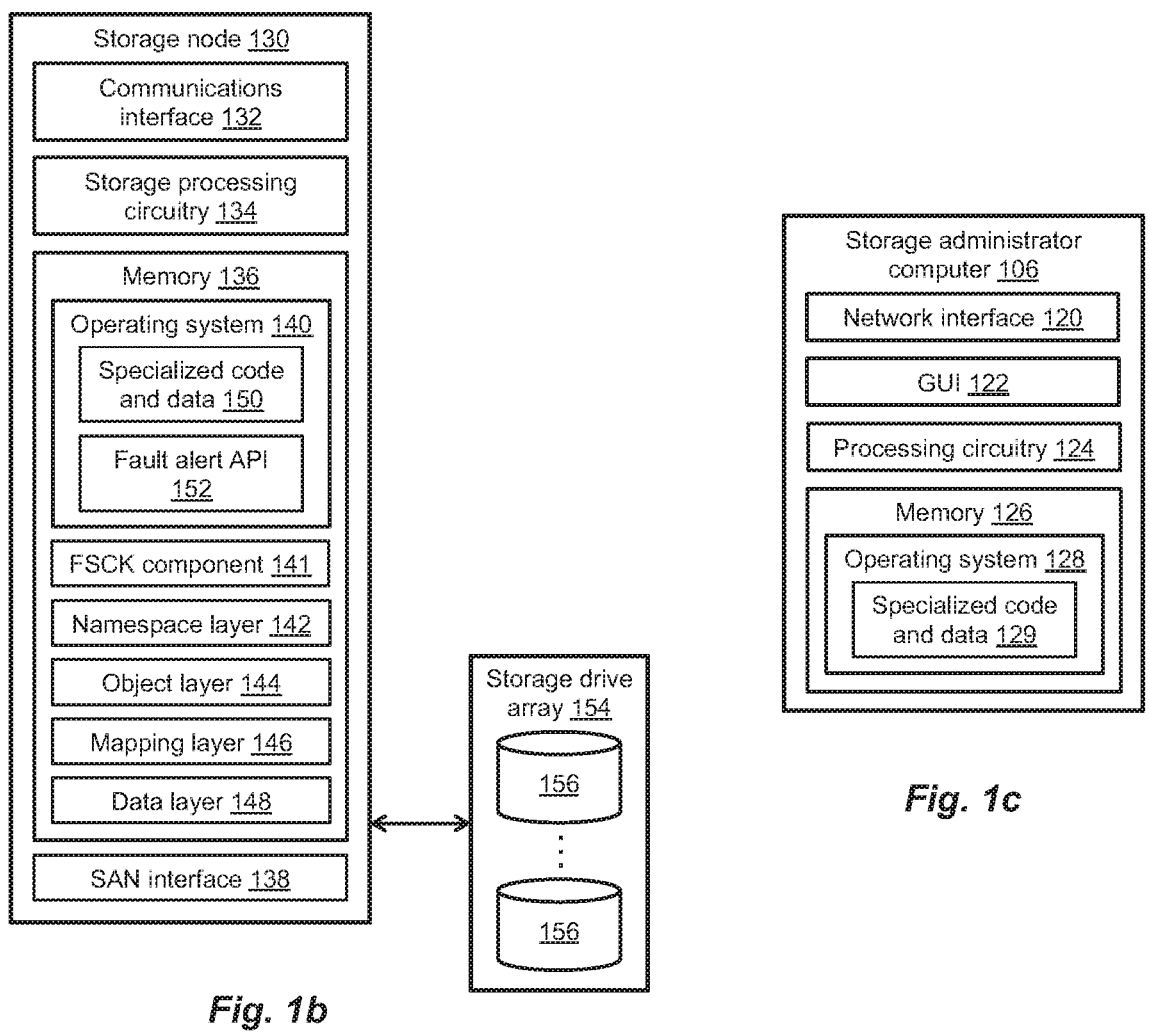

FIG. 1b depicts an exemplary storage node 130 that can be included in the storage appliance 104 of FIG. 1a. In some embodiments, the storage appliance 104 can include a single node like the storage node 130. In some embodiments, the storage appliance 104 can include dual nodes, each like the storage node 130, for providing high availability within the storage appliance 104. As shown in FIG. 1b, the storage node 130 can include a communications interface 132, storage processing circuitry 134, a memory 136, and a network (e.g., SAN) interface 138 or any other suitable interface. The communications interface 132 can include an iSCSI interface, Ethernet interface, FC interface, InfiniBand interface, or any other suitable interface. The communications interface 132 can further include iSCSI adapters, Ethernet adapters, FC adapters, InfiniBand adapters, or any other suitable adapters for converting electronic, optical, and/or wireless signals received over the network(s) 108 to a form suitable for use by the storage processing circuitry 134. The storage node 130 can access, over the SAN interface 138, a storage drive array 154, which can be configured to provide physical storage of storage client data. The storage drive array 154 can include a plurality of physical storage drives 156 such as magnetic disk drives, electronic flash drives, optical drives, and/or any other suitable drives. The storage drive array 154 can be locally attached to an IO channel of the storage node 130 while also being accessible over the network(s) 108. In some embodiments, the storage drive array 154 can be implemented as a dual-ported drive, which can be shared between a pair of storage nodes in a dual-node storage appliance.

The memory 136 of the storage node 130 (see FIG. 1b) can include persistent memory (e.g., flash memory, magnetic memory) and/or non-persistent memory (e.g., dynamic random-access memory (DRAM), static random-access memory (SRAM)). The memory 136 can further include an operating system (OS) 140 such as a Linux operating system (OS), Unix OS, Windows OS, or any other suitable operating system. The memory 136 can be configured to store a variety of software constructs realized in the form of specialized code and data 150 (i.e., program instructions and data), as well as a filesystem checking (FSCK) component 141, a namespace layer 142, an object layer 144, a mapping layer 146, and a data layer 148. The specialized code and data 150, as well as the fault alert engine 112, can be executed by the storage processing circuitry 134 to carry out the techniques and/or methods disclosed herein. As described above, once fault data is recorded in the fault database 114, the storage appliance 104 can send the fault data in a fault alert notification to the storage administrator computer 106. To that end, the memory 136 can further include a fault alert application programming interface (API) 152, which can be configured to send the fault alert notification (e.g., in real-time) to the control path 110 for transmission over the network(s) 108 to the storage administrator computer 106. It is noted that the fault alert engine 112 and API 152 can be implemented to handle alert notifications for faults originating from at least the namespace layer 142 and the mapping layer 146 of the storage node 130.

FIG. 1c depicts an exemplary configuration of the storage administrator computer 106. As shown in FIG. 1c, the storage administrator computer 106 can include a network interface 120 for communicating with the storage appliance 104 over the network(s) 108, as well as a graphical user interface (GUI) 122, processing circuitry 124, and a memory 126. The memory 122 can include an operating system (OS) 128 and be configured to store a variety of software constructs realized in the form of specialized code and data 129 (i.e., program instructions and data). The specialized code and data 129, as well as the fault analytic tool 112, can be executed by the processing circuitry 124. The GUI 122 can be configured to facilitate analysis of fault data extracted from fault alert notifications, allowing a storage administrator to interact with the fault analytic tool 116 for determining both the impact of a fault and the most appropriate recovery action to take in response to the fault.

Figure 2:
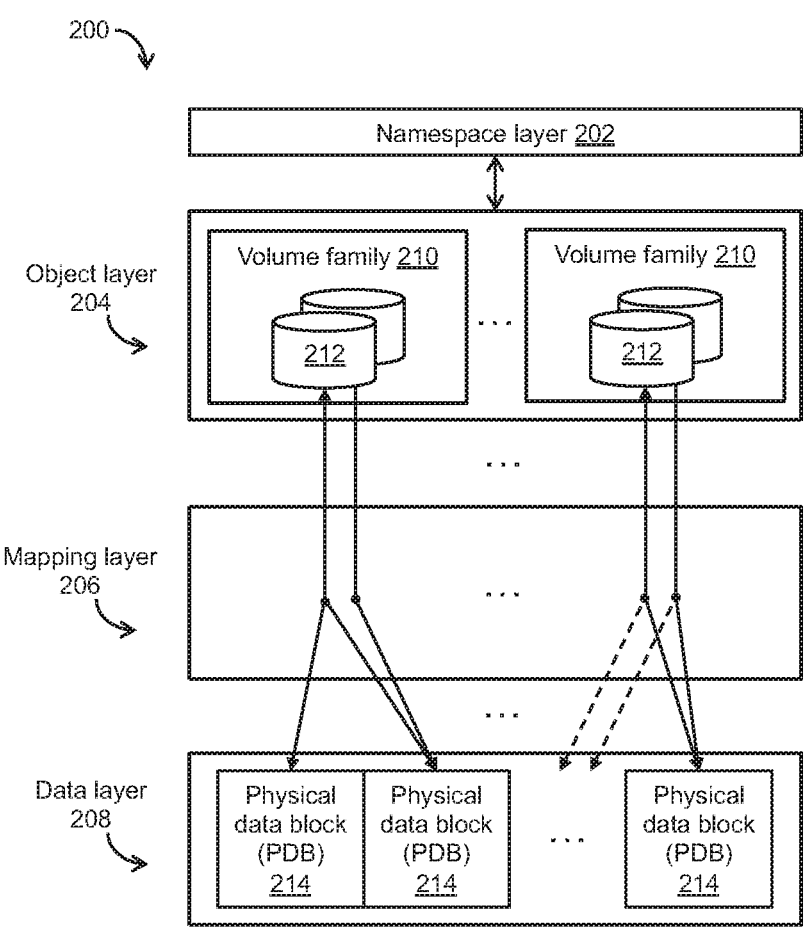
FIG. 2 is a block diagram of an exemplary multi-layer functional organization of the storage node of FIG. 1b.

As described herein, the memory 136 of the storage node 130 (see FIG. 1b) can store a variety of software constructs including the namespace layer 142, the object layer 144, the mapping layer 146, and the data layer 148. FIG. 2 depicts an exemplary multi-layer functional organization 200 of the storage node 130, including exemplary representations of a namespace layer 202, an object layer 204, a mapping layer 206, and a data layer 208. The namespace layer 202 can be configured to organize storage objects such as filesystems, volumes (VOLs), virtual volumes (VVOLs), logical units (LUs), and so on, each of which are accessible to the plurality of storage clients 102.1, . . . , 102.n over the network(s) 108. The namespace layer 202 can be further configured to track logical addresses of the storage objects such as filesystem addresses or offsets into LUs. For example, if a LU made up of one or more extents were to have a maximum size of 10 gigabytes (Gb), then the namespace layer 202 can provide a 10 Gb logical address range to accommodate the LU.

The object layer 204 (see FIG. 2) can be configured to establish and maintain a logical view of storage objects such as volumes 212, as well as present the respective volumes 212 to the plurality of storage clients 102.1, . . . , 102.n as objects of storage IO operations (e.g., read-write IO operations). In some embodiments, the volumes 212 can be organized into volume families 210, in which the volumes 212 of a respective volume family 210 can include a primary volume and one or more point-in-time (PIT) copies (or snapshots) and/or clones of the primary volume. The data layer 208 (see FIG. 2) can be configured to maintain actual data for the respective volumes 212 as one or more collections of physical data blocks (PDBs) 214. In some embodiments, the PDBs 214 can be physical data blocks of an internal filesystem of the mapping layer 206. The PDBs 214 can have a fixed size such as 2 megabytes (Mb) or any other suitable size. Further, the PDBs 214 can be stored in any of a variety of ways on a set of non-volatile storage media such as flash media, magnetic media, or any other suitable media.

The mapping layer 206 (see FIG. 2) can be configured to translate between the logical view of the volumes 212 maintained by the object layer 204 and the collection(s) of PDBs 214 maintained by the data layer 208. As shown in illustrative form in FIG. 2, each volume 212 of the object layer 204 can be mapped by the mapping layer 206 to a corresponding collection of PDBs 214 of the data layer 208. It is noted that a given PDB 214 can belong to a collection that corresponds to more than one volume 212. The mapping layer 206 can therefore implement "block sharing," which can include mapping logical data blocks of two or more of the volumes 212 to the same PDB 214. Such block sharing can be used by the storage node 130 to support snapshot functionality within the storage appliance 104.

During operation, the disclosed techniques can provide lifecycle handling of faults associated with the storage appliance 104, e.g., from when a fault first appears to when it is finally recovered, resolved, or otherwise addressed. In the disclosed techniques, upon detection of a fault associated with the storage appliance 104, information or details pertaining to the fault (i.e., fault data) can be recorded in the fault database 114. Having recorded the fault data in the fault database 114, the storage appliance 104 can send the fault data over the network(s) 108 in a fault alert notification to the storage administrator computer 106. The fault data, as well as any other fault data pertaining to prior detected faults associated with the storage appliance 104, can be analyzed by the fault analytic tool 116 at the storage administrator computer 106, as well as recorded and aggregated in the fault archive database 118. A determination can then be made as to whether the storage appliance 104 should be taken offline immediately based at least on a recommendation of the fault analytic tool 116. Further determinations can also be made as to whether the fault is a correctable fault, and, if determined to be correctable, whether recovery of the fault should be performed immediately or can be deferred to a later time based at least on the recommendation of the fault analytic tool 116.

By recording and aggregating, in the fault archive database 118, fault data pertaining to detected faults associated with the storage appliance 104, analyzing the aggregated fault data by the fault analytic tool 116, and determining whether to perform immediate recovery of one or more of the detected faults or defer fault recovery to a later time based at least on a recommendation of the fault analytic tool 116, taking the storage appliance 104 offline upon detection of a single fault can, for the most part, be avoided. In addition, because the detection of faults is not performed within a fault domain for a filesystem handling files for a single or limited number of volume families, a deduplication domain for the files of the filesystem is not restricted to just the single or limited number of volume families.

The disclosed techniques for providing lifecycle handling of faults associated with a storage appliance will be further understood with reference to the following illustrative example and FIGS. 1a-1c. In this example, the acts of detecting faults, generating data pertaining to the faults, and recording, storing, clearing, and/or resetting fault records in the fault database 114 (see FIG. 1a) are carried out by the specialized code and data 150 implemented in the storage node 130 (see FIG. 1b). In addition, the acts of recording and aggregating fault data in the fault archive database 118 are carried out by the specialized code and data 129 implemented in the storage administrator computer 106 (see FIG. 1c). For example, such a fault may be a correctable or uncorrectable fault caused by data or metavolata corruption or failure of the namespace layer 142 or the mapping layer 146, failure of a data or metadata log, failure of an IO operation, data or metadata validation error, corruption or failure of a storage resource or device upon which a filesystem was organized, or any other suitable cause of corruption, failure, or error in the storage appliance 104.

In this example, it is assumed that a fault associated with the storage appliance 104 is caused by metadata corruption in the mapping layer 146. Upon detection of the fault, data is generated pertaining to the fault and stored as a record in the fault database 114. For example, such fault data can include a detailed description of the metadata corruption (e.g., the cause of the metadata corruption, scope of data loss), the start logical address and end logical address defining the region of metadata corruption, the ID of a volume family associated with the fault, the inode number of a volume associated with the fault within the volume family, the metadata type (i.e., metadata at the highest level, mid-level, or leaf level of the mapping layer 146), and so on. The fault alert engine 112 then generates a fault alert notification containing the fault data. The fault alert API 152 stores the record containing the fault data in the fault database 114 and sends the fault alert notification to the control path 110 for transmission over the network(s) 108 to the storage administrator computer 106. Such a control path (also referred to herein as the "management path") can correspond to a flow of data management or control commands through the storage appliance 104. The control (or management) path 110 can correspond to a logical flow through hardware and/or software components or layers of the storage appliance 104 in connection with issuing control or management commands pertaining to fault alert notifications, as well as receiving responses to such issued commands.

Upon receipt of the fault alert notification at the storage administrator computer 106, the fault data is extracted from the fault alert notification and stored as a record in the fault archive database 118. Further, the fault data is analyzed by the fault analytic tool 116 to determine the impact of the fault and generate a recommendation for recovery of the fault. In this example, it was assumed that the fault associated with the storage appliance 104 was caused by metadata corruption in the mapping layer 146. As such, the fault analytic tool 116 makes an initial determination that the fault is correctable. In addition, the fault analytic tool 116 makes a determination as to whether recovery of the fault is deferrable or undeferrable. For example, if the fault analytic tool 116 determines that such metadata corruption is recoverable from alternative resources, then it may determine that recovery of the fault is deferrable. In this case, the fault analytic tool 116 may generate a recommendation to fence-off and/or fail certain 10 operations at the storage appliance 104 to minimize the impact of the fault and defer the recovery of the fault to a later time. Alternatively, if the fault analytic tool 116 determines that such metadata corruption is not recoverable from alternative resources, then it may determine that recovery of the fault is undeferrable. In this case, the fault analytic tool 116 may generate a recommendation to freeze the filesystem, take the storage appliance 104 offline, and execute filesystem checking immediately (e.g., via the FSCK component 141) to recover the corrupted metadata to a consistent state, thereby restoring the integrity of the filesystem. The storage administrator can then review and/or consider the recommendation generated by the fault analytic tool 116 via the GUI 122 of the storage administrator computer 106. If the fault analytic tool 116 determined that recovery of the fault was deferrable, then the storage administrator can schedule execution of a recovery script to perform filesystem checking at a later time. If the fault analytic tool 116 determined that recovery of the fault was undeferrable, then the storage administrator can manually start execution of the recovery script to carry out immediate restoration of the integrity of the filesystem. Once recovery of the fault has been successfully done or completed, the fault database 114 is archived and cleared, and the storage appliance 104 is ready for normal operation.

As described herein with reference to this example, upon receipt of the fault alert notification at the storage administrator computer 106, the fault data is extracted from the fault alert notification and stored as a record in the fault archive database 118. In the event it was determined that recovery of the fault pertaining to metadata corruption in the mapping layer 146 was deferrable, recovery of the fault can be scheduled at a later time, and fault data pertaining to subsequent faults at the storage appliance 104 can be analyzed by the fault analytic tool 116 and recorded and aggregated in the fault archive database 118. In addition, the fault analytic tool 116 can generate further recommendations regarding recovery of the fault in view of its analysis of the aggregated fault data. If, based on its analysis of the aggregated fault data, the fault analytic tool 116 determines that continued deferral of recovery of the fault would significantly impair the performance of the storage appliance 104, then it may determine that recovery of the fault should now be performed immediately. In effect, the fault analytic tool 116 can change the state of fault recovery from "deferrable" to "undeferrable." The storage administrator can then review and/or consider this further recommendation of the fault analytic tool 116 and manually start execution of the recovery script to take the storage appliance 104 offline and perform filesystem checking immediately.

Figure 3:
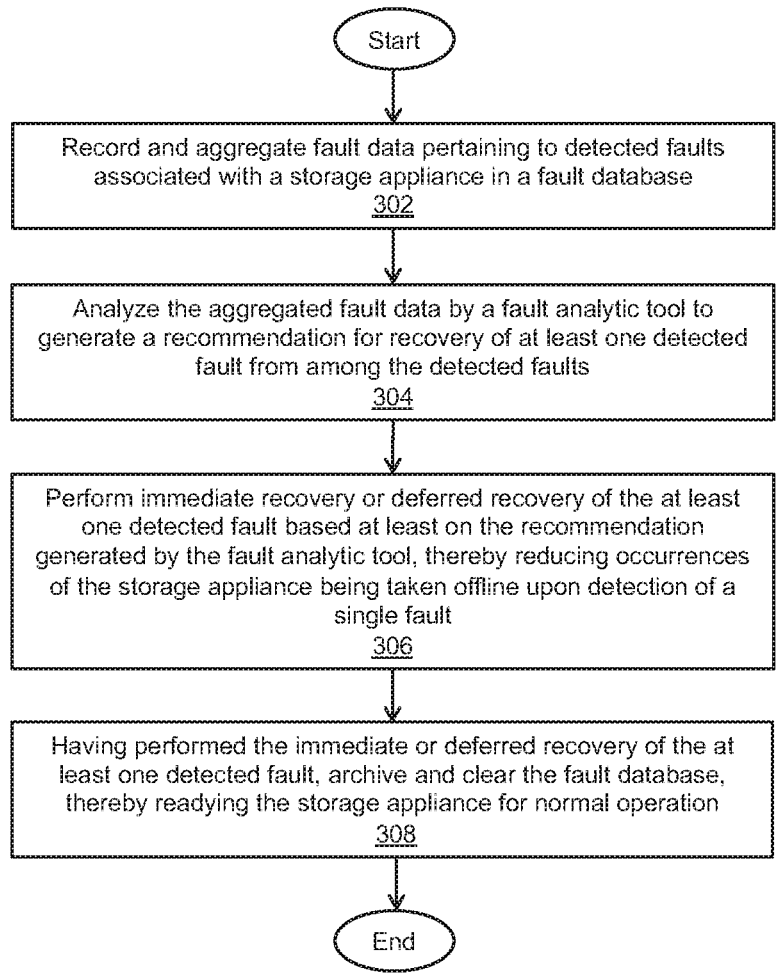
FIG. 3 is a flow diagram of an exemplary method of lifecycle handling of faults associated with a storage appliance.

An exemplary method of lifecycle handling of faults associated with a storage appliance is described below with reference to FIG. 3. As depicted in block 302, fault data pertaining to detected faults associated with a storage appliance are recorded and aggregated in a fault database. As depicted in block 304, the aggregated fault data are analyzed by a fault analytic tool to generate a recommendation for recovery of at least one detected fault from among the detected faults. As depicted in block 306, immediate or deferred recovery of the at least one detected fault is performed based at least on the recommendation generated by the fault analytic tool, thereby reducing occurrences of the storage appliance being taken offline upon detection of a single fault. As depicted in block 308, having performed the immediate or deferred recovery of the at least one detected fault, the fault database is archived and cleared, thereby readying the storage appliance for normal operation.

Having described the above illustrative embodiments, other alternative embodiments or variations can be made and/or practiced. For example, it was described herein that determinations can be made as to whether a fault associated with a storage appliance is a correctable fault, and, if determined to be correctable, whether recovery of the fault should be performed immediately or can be deferred to a later time based at least on a recommendation of a fault analytic tool. In some embodiments, if the fault associated with the storage appliance is a metadata fault (e.g., a metadata fault in the namespace or mapping layer, a metadata validation error), then recovery of the fault can be performed immediately. Alternatively, if the fault associated with the storage appliance is a non-metadata fault (e.g., a non-metadata fault pertaining to the operation of a data log, an IO operation, an out-of-memory condition, an out-of-storage-space condition), then recovery of the fault can be deferred to a later time.

It was further described herein that a fault associated with a storage appliance may be a correctable or uncorrectable fault caused by data or metadata corruption or failure of the namespace or mapping layer, failure of a data or metadata log, failure of an IO operation, a data or metadata validation error, corruption or failure of a storage resource or device upon which a filesystem was organized, and so on. In some embodiments, such a fault associated with a storage appliance may be determined to be a correctable or uncorrectable fault caused by a data log write or read failure; a metadata log write or read failure; a data checksum validation failure; and/or, in a storage cluster, a data tier write or read failure, a data tier allocation failure, a metadata tier write or read failure, and/or a metadata tier allocation failure.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or simply "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

A computer program product can be configured to deliver all or a portion of specialized code and data for implementing the disclosed techniques. Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by one or more processors or processing circuitry, the various techniques and/or methods disclosed herein.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of lifecycle handling of faults associated with a storage appliance, comprising:
   recording and aggregating fault data pertaining to a plurality of detected faults associated with a storage appliance in a fault database;
   analyzing the aggregated fault data to generate a recommendation for recovery of a detected fault from among the plurality of detected faults;
   performing immediate or deferred recovery of the detected fault based at least on the recommendation, thereby reducing occurrences of the storage appliance being taken offline upon detection of a single fault;
   determining that the detected fault is correctable; and
   having determined that the detected fault is correctable, determining whether the recovery of the detected fault is deferrable or undeferrable,
   wherein performing immediate recovery of the detected fault includes, having determined that the recovery of the detected fault is undeferrable, taking the storage appliance offline, and
   wherein performing deferred recovery of the detected fault includes, having determined that the recovery of the detected fault is deferrable, scheduling the recovery of the detected fault to be performed at a later time.

2. The method of claim 1 further comprising:
having performed the immediate or deferred recovery of the detected fault, archiving and clearing the fault database, thereby readying the storage appliance for normal operation.

3. The method of claim 1 further comprising:
generating at least one fault alert notification containing the fault data.

4. The method of claim 3 further comprising:
sending, by a fault alert application programming interface (API), the at least one fault alert notification containing the fault data to a management control path of the storage appliance for transmission from the storage appliance to a storage administrator computer.

5. The method of claim 4 further comprising:
extracting at least some of the fault data from the at least one fault alert notification.

6. The method of claim 1 further comprising:
having determined that the recovery of the detected fault is undeferrable, scheduling the recovery of the detected fault to be performed immediately.

7. The method of claim 1 further comprising:
upon completion of the recovery of the detected fault, clearing or resetting a record of the detected fault from the fault database.

8. The method of claim 1 further comprising:
having determined that the recovery of the detected fault is deferrable, continuing to aggregate fault data and analyze the aggregated fault data for subsequent detected faults associated with the storage appliance.

9. The method of claim 8 further comprising:
determining whether or not the recovery of the detected fault is deferrable in view of the continued aggregation and analysis of the aggregated fault data for the subsequent detected faults associated with the storage appliance.

10. The method of claim 9 further comprising:
having determined that the recovery of the detected fault is not deferrable in view of the continued aggregation and analysis of the aggregated fault data, changing a state of the recovery of the detected fault from deferrable to undeferrable; and
scheduling the recovery of the detected fault to be performed immediately.

11. A system for lifecycle handling of faults associated with a storage appliance, comprising:
a memory; and
processing circuitry configured to execute program instructions out of the memory to:

record and aggregate fault data pertaining to a plurality of detected faults associated with a storage appliance in a fault database;

analyze the aggregated fault data to generate a recommendation for recovery of a detected fault from among the plurality of detected faults;

perform immediate or deferred recovery of the detected fault based at least on the recommendation, thereby reducing occurrences of the storage appliance being taken offline upon detection of a single fault;

determine that the detected fault is correctable; and having determined that the detected fault is correctable, determine whether the recovery of the detected fault is deferrable or undeferrable, wherein to perform immediate recovery of the detected fault includes, having determined that the recovery of the detected fault is undeferrable, to take the storage appliance offline, and wherein to perform deferred recovery of the detected fault includes, having determined that the recovery of the detected fault is deferrable, to schedule the recovery of the detected fault to be performed at a later time.

12. The system of claim 11 wherein the processing circuitry is further configured to execute the program instructions out of the memory, having determined that the recovery of the detected fault is deferrable, to continue to aggregate fault data and analyze the aggregated fault data for subsequent detected faults associated with the storage appliance.

13. The system of claim 12 wherein the processing circuitry is further configured to execute the program instructions out of the memory to determine whether or not the recovery of the detected fault is deferrable in view of the continued aggregation and analysis of the aggregated fault data for the subsequent detected faults associated with the storage appliance.

14. The system of claim 13 wherein the processing circuitry is further configured to execute the program instructions out of the memory, having determined that the recovery of the detected fault is not deferrable in view of the continued aggregation and analysis of the aggregated fault data, to change a state of the recovery of the detected fault from deferrable to undeferrable, and to schedule the recovery of the detected fault to be performed immediately.

15. A computer program product including a set of non-transitory, computer-readable media having instructions that, when executed by processing circuitry, cause the processing circuitry to perform a method of lifecycle handling of faults associated with a storage appliance, the method comprising:

recording and aggregating fault data pertaining to a plurality of detected faults associated with a storage appliance in a fault database;

analyzing the aggregated fault data to generate a recommendation for recovery of a detected fault from among the plurality of detected faults;

performing immediate or deferred recovery of the detected fault based at least on the recommendation, thereby reducing occurrences of the storage appliance being taken offline upon detection of a single fault;

determining that the detected fault is correctable; and having determined that the detected fault is correctable, determining whether the recovery of the detected fault is deferrable or undeferrable, wherein performing immediate recovery of the detected fault includes, having determined that the recovery of the detected fault is undeferrable, taking the storage appliance offline, and wherein performing deferred recovery of the detected fault includes, having determined that the recovery of the detected fault is deferrable, scheduling the recovery of the detected fault to be performed at a later time.

16. The computer program product of claim 15 wherein the method further comprises:

having determined that the recovery of the detected fault is deferrable, continuing to aggregate fault data and analyze the aggregated fault data for subsequent detected faults associated with the storage appliance;

determining whether or not the recovery of the detected fault is deferrable in view of the continued aggregation and analysis of the aggregated fault data for the subsequent detected faults associated with the storage appliance;

having determined that the recovery of the detected fault is not deferrable in view of the continued aggregation and analysis of the aggregated fault data, changing a state of the recovery of the detected fault from deferrable to undeferrable; and scheduling the recovery of the detected fault to be performed immediately.

* * * * *